US008848607B2

(12) United States Patent
Wang et al.

(10) Patent No.: US 8,848,607 B2
(45) Date of Patent: Sep. 30, 2014

(54) METHOD AND APPARATUS TO FACILITATE SUPPORT FOR MULTI-RADIO COEXISTENCE

(75) Inventors: Jibing Wang, San Diego, CA (US); Joel Benjamin Linsky, San Diego, CA (US); Tamer A. Kadous, San Diego, CA (US); Ashok Mantravadi, San Diego, CA (US); Pranav Dayal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 13/070,577

(22) Filed: Mar. 24, 2011

(65) Prior Publication Data

US 2012/0093009 A1 Apr. 19, 2012

Related U.S. Application Data

(60) Provisional application No. 61/319,123, filed on Mar. 30, 2010.

(51) Int. Cl.
*H04W 4/00* (2009.01)
*H04W 16/14* (2009.01)
*H04W 88/06* (2009.01)

(52) U.S. Cl.
CPC .............. *H04W 16/14* (2013.01); *H04W 88/06* (2013.01); *Y02B 60/50* (2013.01)
USPC .......................... 370/328; 370/338; 455/552.1

(58) Field of Classification Search
None
See application file for complete search history.

(56) References Cited

U.S. PATENT DOCUMENTS

| 2007/0037594 | A1 | 2/2007 | Palenius et al. |
| 2008/0008127 | A1 | 1/2008 | Choi et al. |
| 2009/0163145 | A1 | 6/2009 | Xhafa et al. |
| 2009/0213827 | A1 | 8/2009 | Bitran et al. |
| 2009/0225717 | A1 | 9/2009 | Banerjea |
| 2010/0029325 | A1* | 2/2010 | Wang et al. ................. 455/553.1 |
| 2010/0040033 | A1* | 2/2010 | Xhafa et al. ................... 370/338 |
| 2010/0067423 | A1* | 3/2010 | Sun et al. ....................... 370/311 |
| 2010/0067424 | A1* | 3/2010 | Sun et al. ....................... 370/311 |

(Continued)

FOREIGN PATENT DOCUMENTS

| EP | 1956860 A2 | 8/2008 |
| JP | 2007515903 A | 6/2007 |
| JP | 2008022146 A | 1/2008 |
| JP | 2009005195 A | 1/2009 |
| WO | WO-2005066914 A1 | 7/2005 |

OTHER PUBLICATIONS

International Search Report and Written Opinion—PCT/US2011/030523—ISA/EPO—Jul. 22, 2011.

*Primary Examiner* — Anh-Vu Ly
(74) *Attorney, Agent, or Firm* — Rupit M. Patel

(57) ABSTRACT

Interference between potentially conflicting radio access technologies (RATs) in a wireless device may be managed through a coexistence manager which allows communication using a first active RAT (e.g., Long Term Evolution (LTE)) and communication with a second active RAT (e.g., wireless local area network (WLAN)) when the first RAT is not scheduled for communicating during an uplink timeslot. Communications by a WLAN radio may be controlled using a power save mode. WLAN communications may be timed so that downlink signals (such as data or acknowledgement messages) to the WLAN radio are received during an inactive uplink subframe for an LTE radio. WLAN communications may also be timed so that downlink signals to the WLAN radio are received during downlink times scheduled for an LTE radio.

16 Claims, 11 Drawing Sheets

(56) References Cited

U.S. PATENT DOCUMENTS

| | | |
|---|---|---|
| 2010/0128689 A1 | 5/2010 | Yoon et al. |
| 2010/0142487 A1 | 6/2010 | Kim |
| 2010/0142504 A1* | 6/2010 | Bitran et al. ........... 370/338 |
| 2010/0238807 A1* | 9/2010 | Xhafa et al. ........... 370/241 |
| 2011/0128934 A1 | 6/2011 | Lee et al. |
| 2011/0242969 A1 | 10/2011 | Dayal et al. |
| 2012/0034913 A1* | 2/2012 | Wang et al. ........... 455/426.1 |
| 2013/0155884 A1* | 6/2013 | Wang et al. ........... 370/252 |

* cited by examiner

METHOD AND APPARATUS TO FACILITATE SUPPORT FOR MULTI-RADIO COEXISTENCE

CROSS REFERENCE TO RELATED APPLICATION

This application claims the benefit of U.S. Provisional Patent Application No. 61/319,123 entitled "LTE AND WLAN COEXISTENCE SOLUTIONS," filed Mar. 30, 2010, the disclosure of which is expressly incorporated herein by reference in its entirety.

This application is related to commonly assigned U.S. patent application Ser. No. 13/022,823, filed Feb. 8, 2011 in the names of T. KADOUS et al. the disclosure of which is expressly incorporated herein by reference in its entirety.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher be reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

BRIEF SUMMARY

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

A method of wireless communication is offered. The method includes actively communicating on a first radio access technology (RAT). The method also includes actively communicating on a second RAT when the first RAT is not scheduled for communicating during an uplink timeslot.

An apparatus operable in a wireless communication system is offered. The apparatus includes means for actively communicating on a first radio access technology (RAT). The apparatus also includes means for actively communicating on a second RAT when the first RAT is not scheduled for communicating during an uplink timeslot.

A computer program product configured for wireless communication is offered. The computer program product includes a computer-readable medium having program code recorded thereon. The program code includes program code to actively communicate on a first radio access technology (RAT). The program code also includes program code to actively communicate on a second RAT when the first RAT is not scheduled for communicating during an uplink timeslot.

An apparatus configured for operation in a wireless communication network is offered. The apparatus includes a memory and a processor(s) coupled to memory. The processor(s) is configured to actively communicate on a first radio access technology (RAT). The processor(s) is also configured to actively communicate on a second RAT when the first RAT is not scheduled for communicating during an uplink timeslot.

A method of wireless communication is offered. The method includes actively communicating on a first radio access technology (RAT). The method also includes actively communicating on a second RAT by sending a data request causing the second RAT to receive data during a downlink time scheduled for the first RAT.

An apparatus operable in a wireless communication system is offered. The apparatus includes means for actively communicating on a first radio access technology (RAT). The apparatus also includes means for actively communicating on a second RAT by sending a data request causing the second RAT to receive data during a downlink time scheduled for the first RAT.

A computer program product configured for wireless communication is offered. The computer program product includes a computer-readable medium having program code recorded thereon. The program code includes program code to actively communicate on a first radio access technology (RAT). The program code also includes program code to actively communicate on a second RAT by sending a data request causing the second RAT to receive data during a downlink time scheduled for the first RAT.

An apparatus configured for operation in a wireless communication network is offered. The apparatus includes a memory and a processor(s) coupled to memory. The processor(s) is configured to actively communicate on a first radio access technology (RAT). The processor(s) is also configured to actively communicate on a second RAT by sending a data request causing the second RAT to receive data during a downlink time scheduled for the first RAT.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
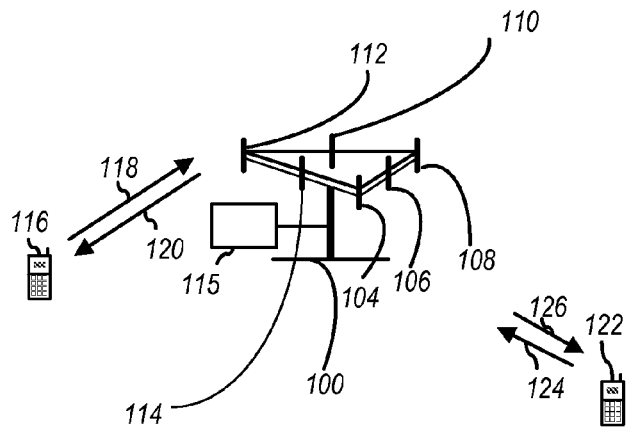
FIG. 1 illustrates a multiple access wireless communication system according to one aspect.

Various aspects of the disclosure provide techniques to mitigate coexistence issues in multi-radio devices, where significant in-device coexistence problems can exist between, e.g., the LTE and Industrial Scientific and Medical (ISM) bands (e.g., for BT/WLAN). As explained above, some coexistence issues persist because an eNB is not aware of interference on the UE side that is experienced by other radios. According to one aspect, the UE declares a Radio Link Failure (RLF) and autonomously accesses a new channel or Radio Access Technology (RAT) if there is a coexistence issue on the present channel. The UE can declare a RLF in some examples for the following reasons: 1) UE reception is affected by interference due to coexistence, and 2) the UE transmitter is causing disruptive interference to another radio. The UE then sends a message indicating the coexistence issue to the eNB while reestablishing connection in the new channel or RAT. The eNB becomes aware of the coexistence issue by virtue of having received the message.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3$^{rd}$ Generation Partnership Project" (3GPP). cdma2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over a downlink (DL) 120 and receive information from the UE 116 over an uplink (UL) 118. The UE 122 is in communication with antennas 106 and 108, while antennas 106 and 108 transmit information to the UE 122 over a downlink (DL) 126 and receive information from the UE 122 over an uplink 124. In an FDD system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
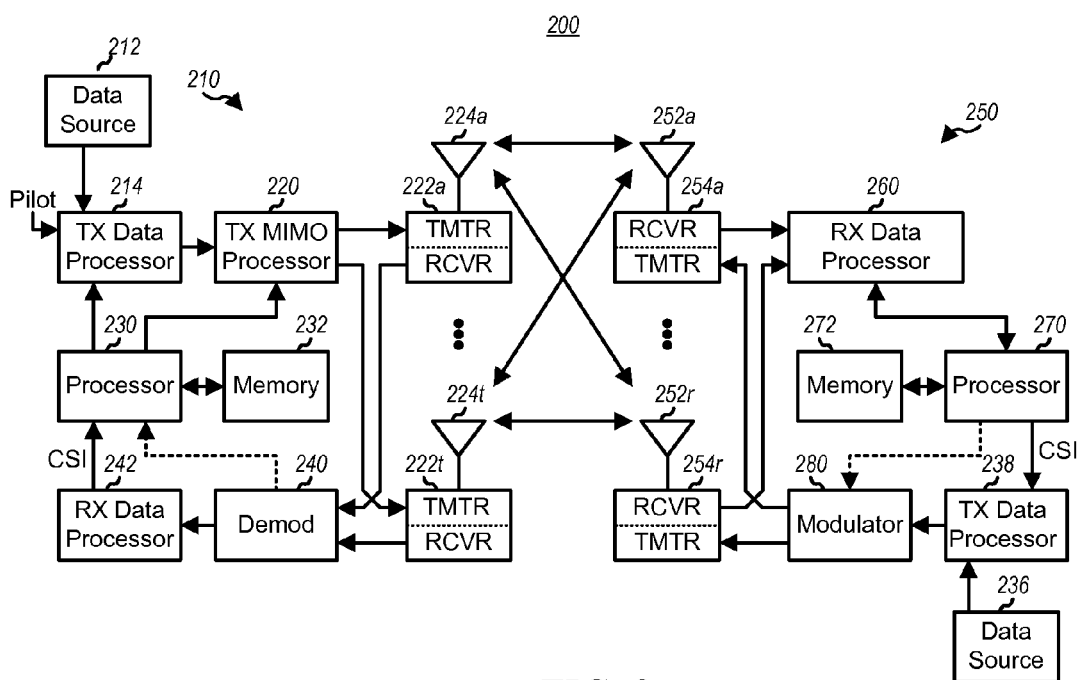
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
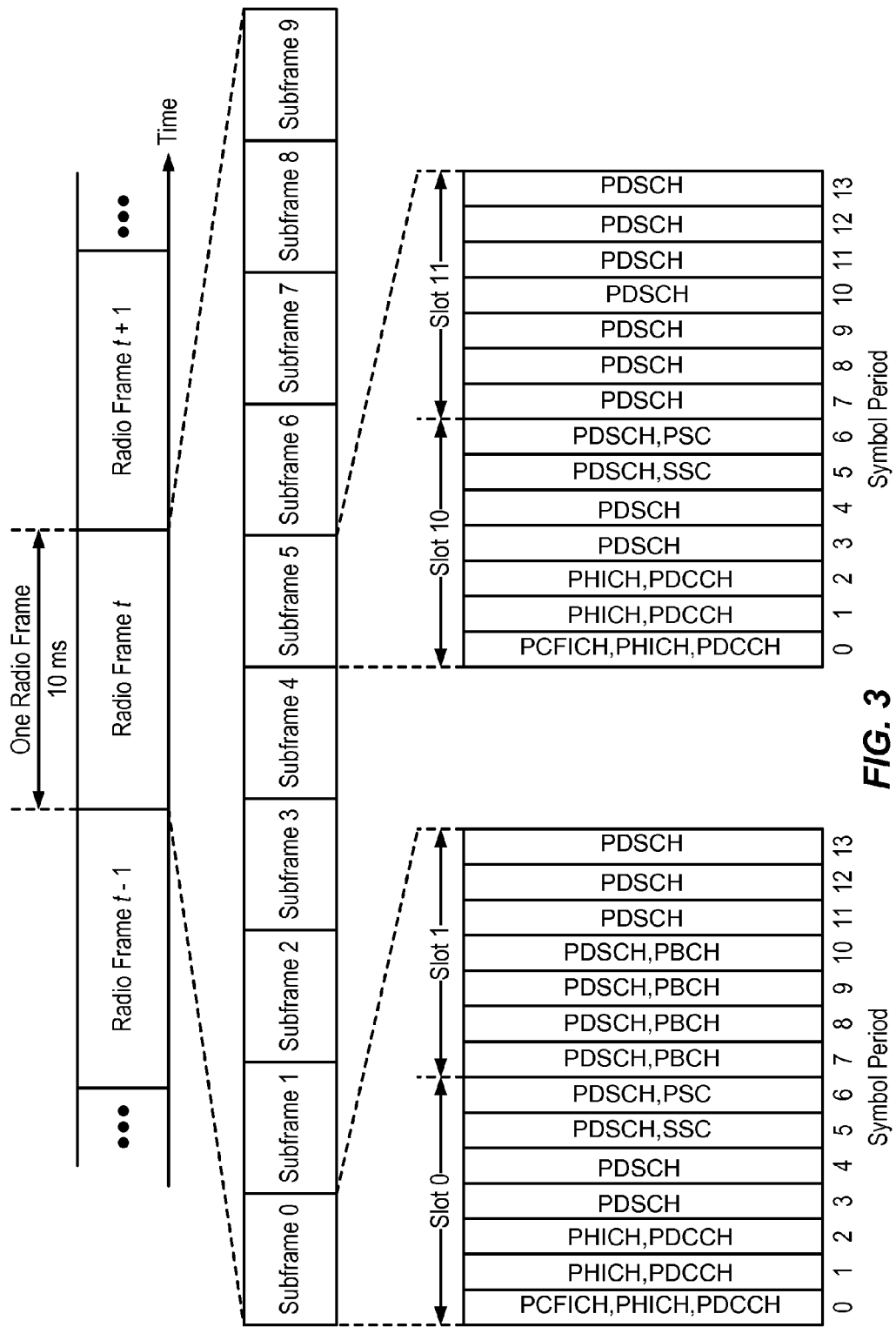
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARM). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
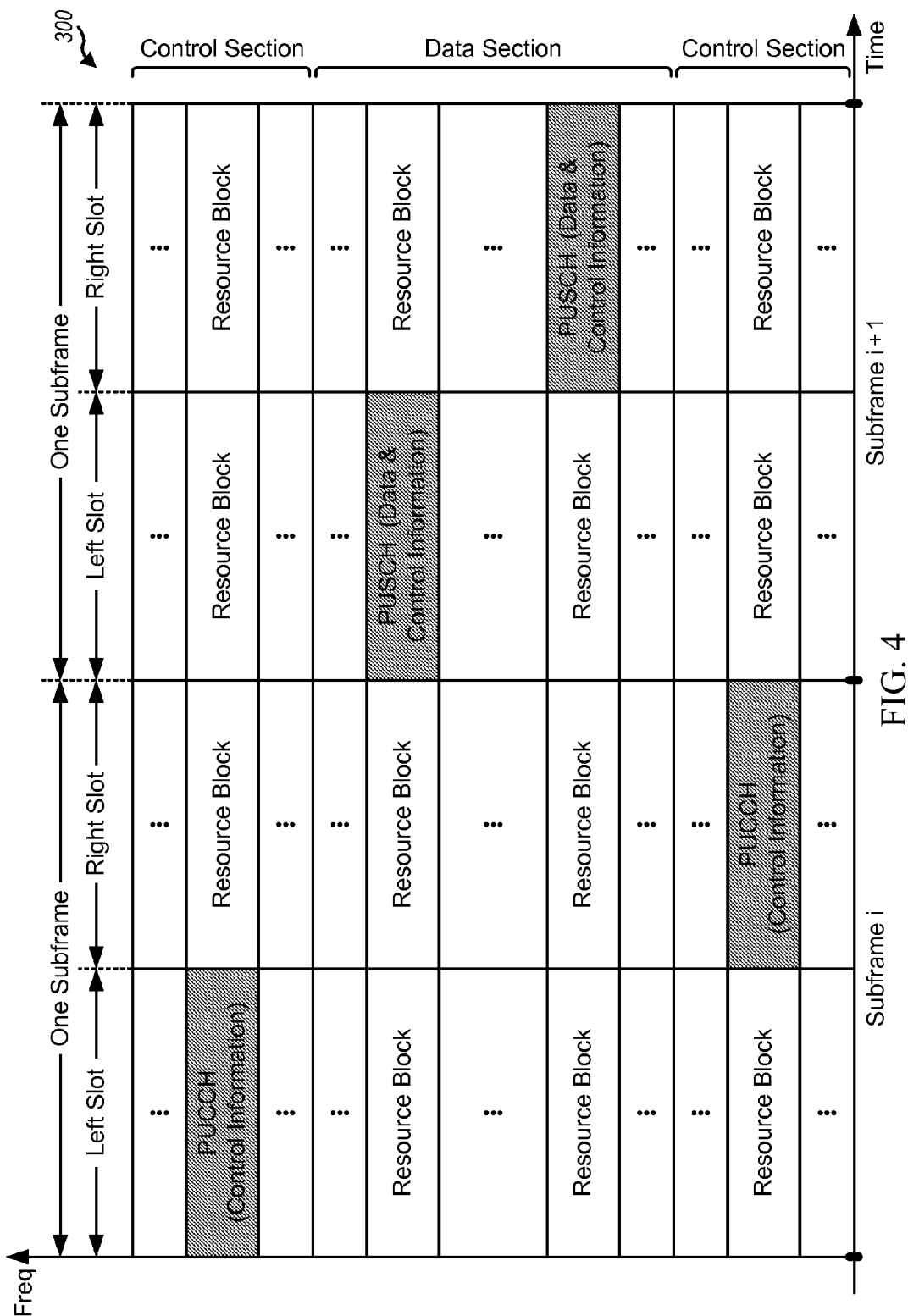
FIG. 4 is a block diagram conceptually illustrating an exemplary frame structure in uplink Long Term Evolution (LTE) communications.

FIG. 4 is a block diagram conceptually illustrating an exemplary frame structure 300 in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
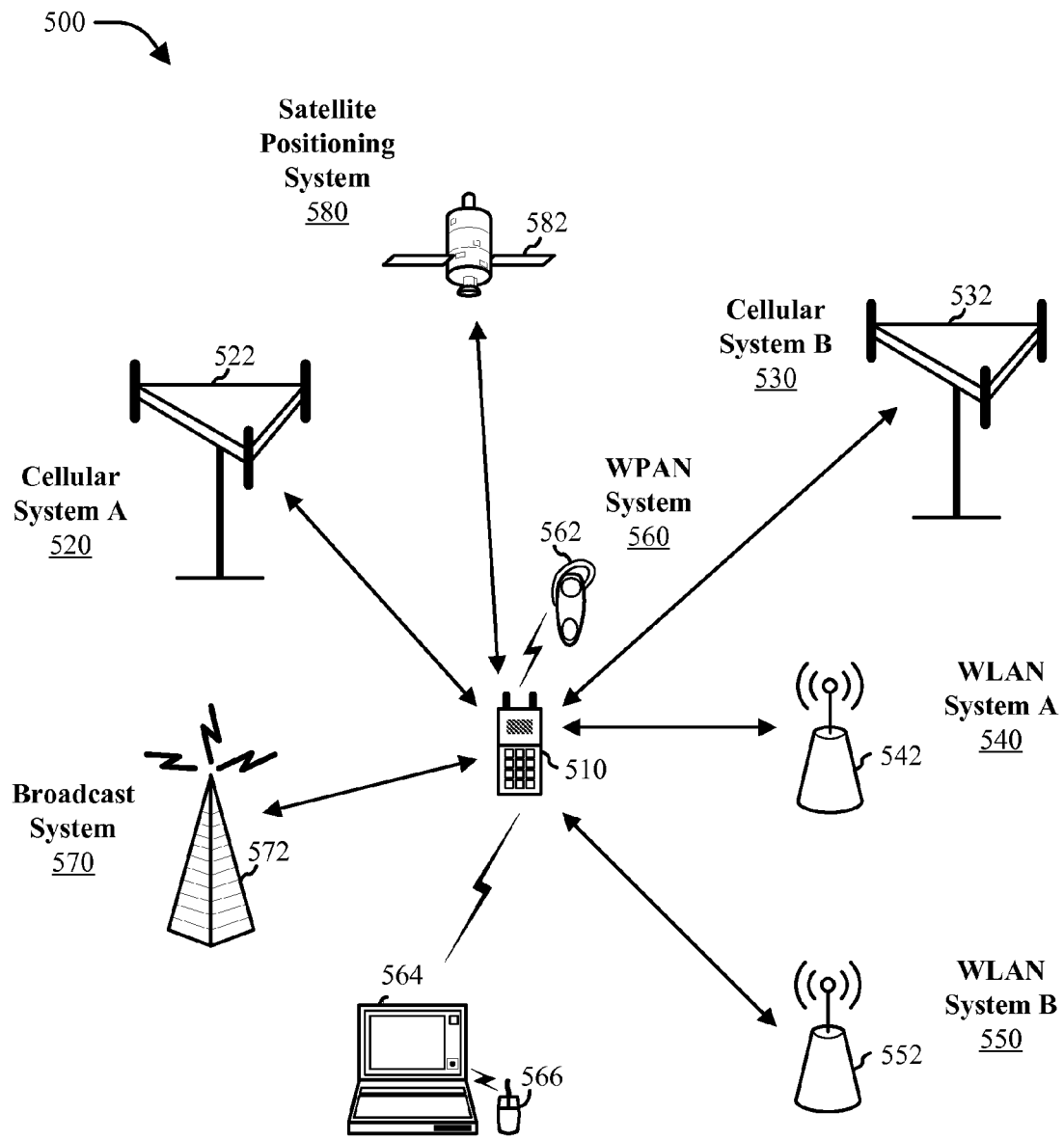
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
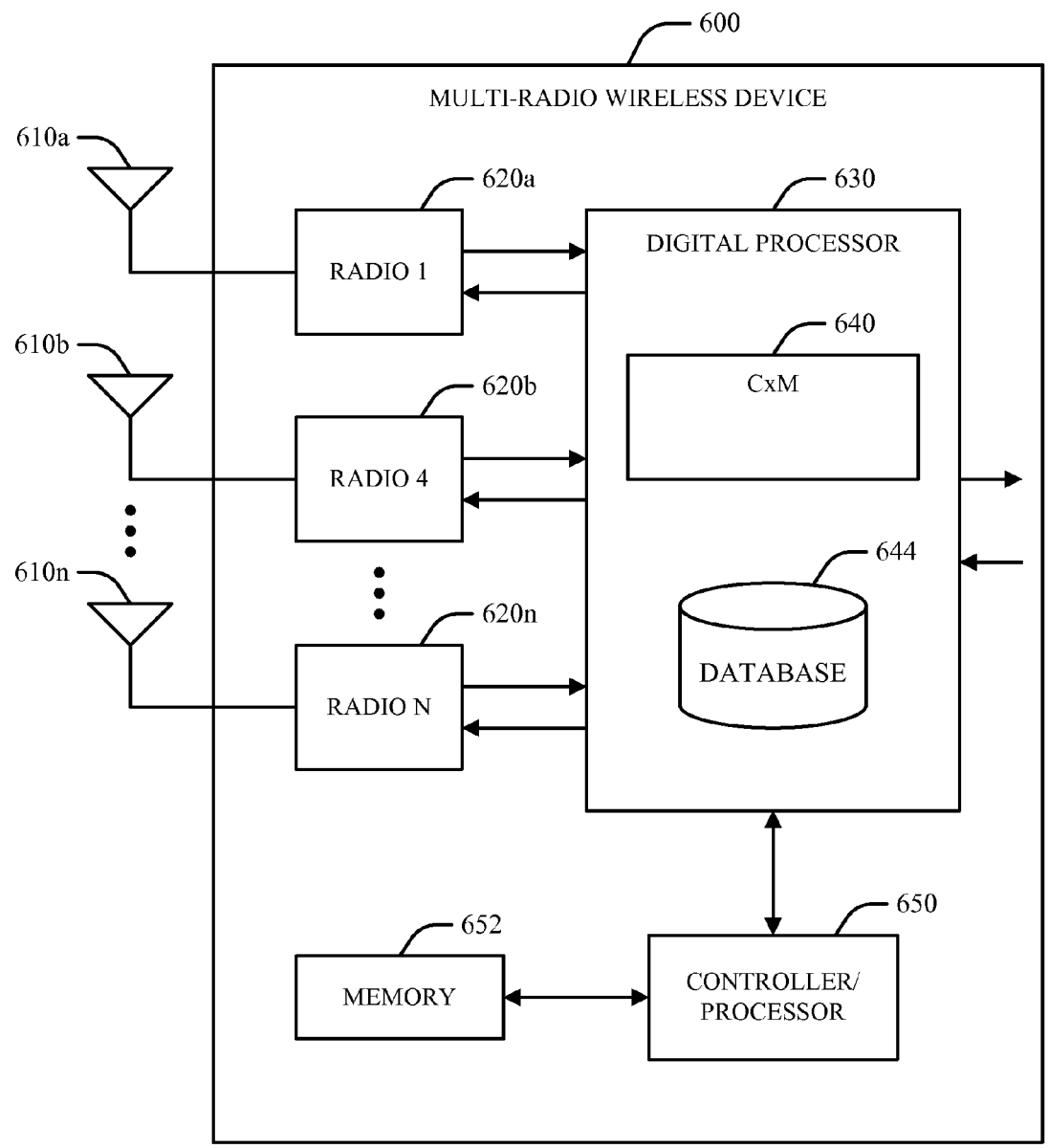
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a CxM 640 that can control operation of the radios 620 in order to improve the performance of the wireless device 600 as generally described herein. The CxM 640 can have access to a database 644, which can store information used to control the operation of the radios 620. As explained further below, the CxM 640 can be adapted for a variety of techniques to decrease interference between the radios. In one example, the CxM 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
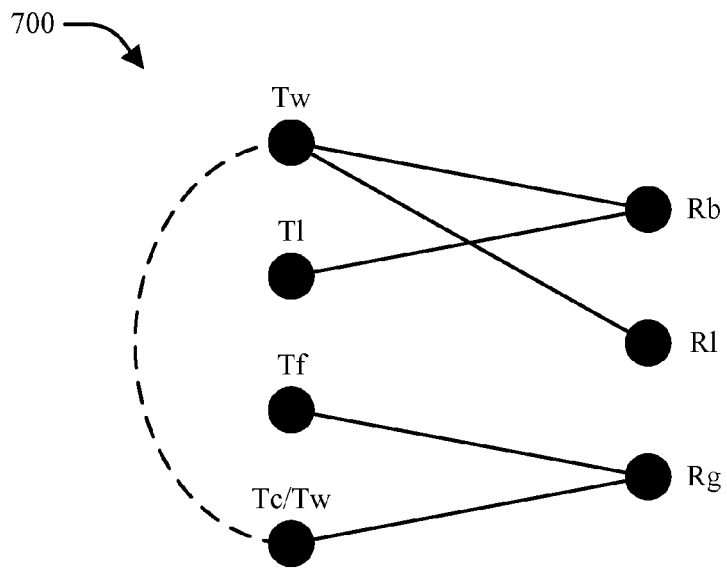
FIG. 7 is graph showing respective potential collisions between seven example radios in a given decision period.

In an aspect, the CxM 640 can manage operation of respective radios 620 utilized by wireless device 600 in order to avoid interference and/or other performance degradation associated with collisions between respective radios 620. CxM 640 may perform one or more processes, such as those illustrated in FIG. 13. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
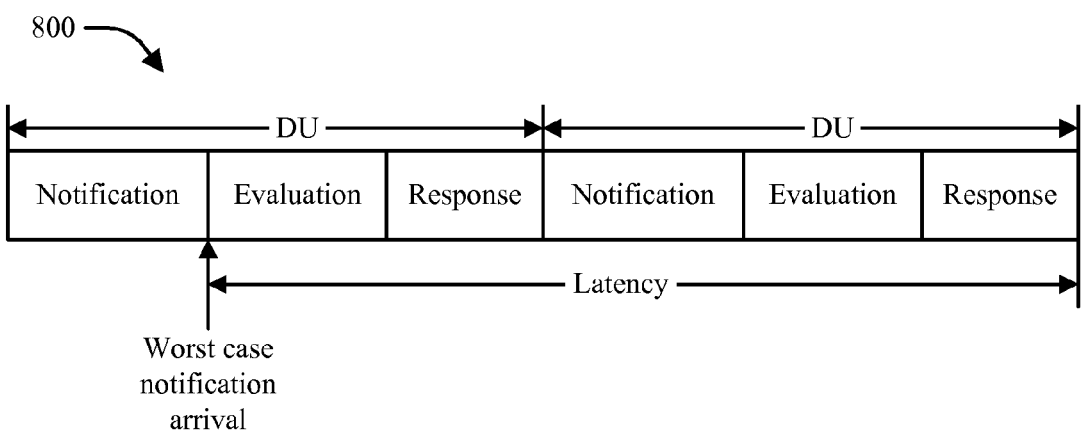
FIG. 8 is a diagram showing operation of an example Coexistence Manager (CxM) over time.

In one aspect, an example CxM 640 can operate in time in a manner such as that shown by diagram 800 in FIG. 8. As diagram 800 illustrates, a timeline for CxM operation can be divided into Decision Units (DUs), which can be any suitable uniform or non-uniform length (e.g., 100 µs) where notifications are processed, and a response phase (e.g., 20 µs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNB can use to make inter-frequency or inter-RAT handoff decisions to, e.g., move LTE to a channel or RAT with no coexistence issues. However, it can be appreciated that these existing techniques will not work if, for example, the LTE UL is causing interference to Bluetooth/WLAN but the LTE downlink does not see any interference from Bluetooth/WLAN. More particularly, even if the UE autonomously moves itself to another channel on the UL, the eNB can in some cases handover the UE back to the problematic channel for load balancing purposes. In any case, it can be appreciated that existing techniques do not facilitate use of the bandwidth of the problematic channel in the most efficient way.

Figure 9:
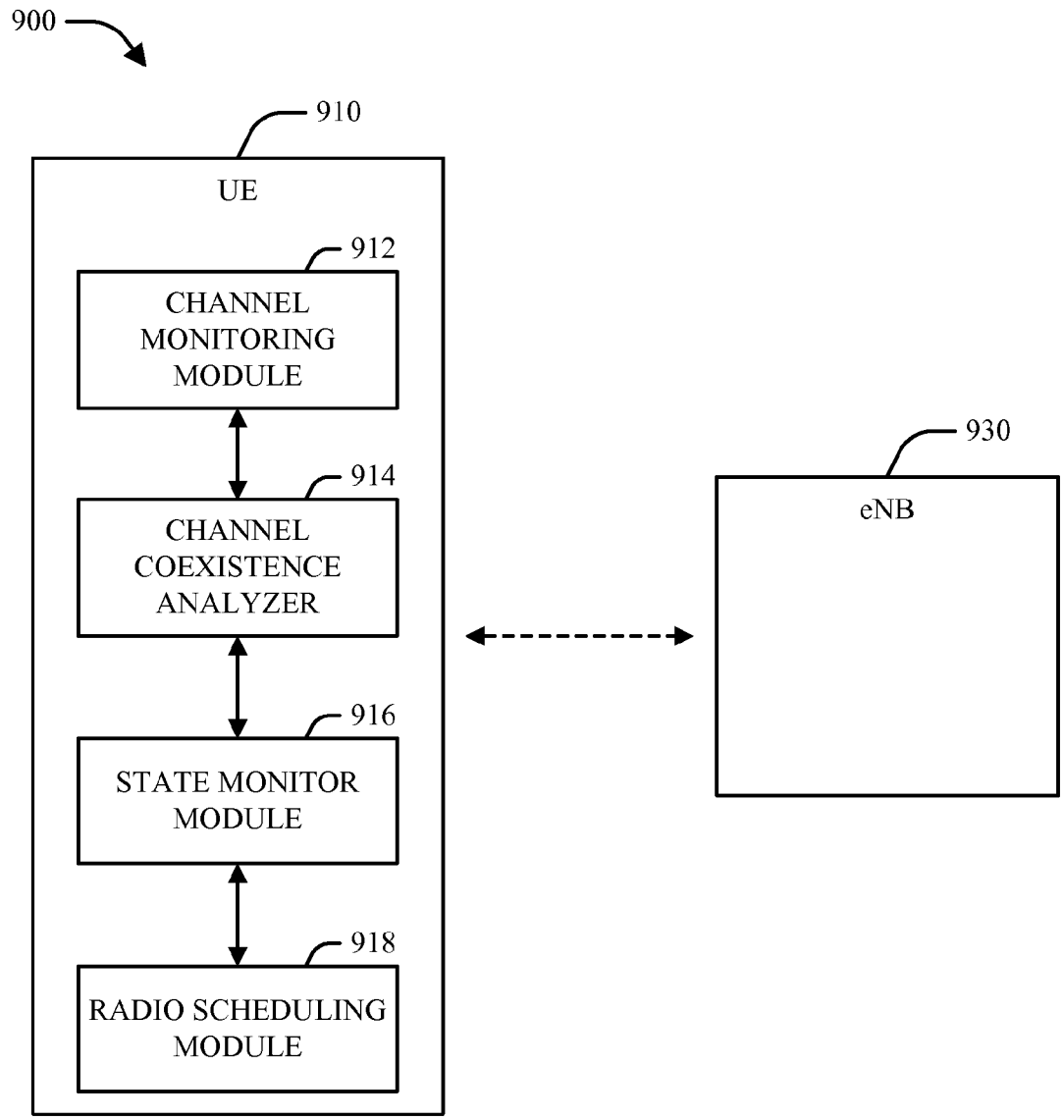
FIG. 9 is a block diagram of a system for providing support within a wireless communication environment for multi-radio coexistence management according to one aspect.

Turning now to FIG. 9, a block diagram of a system 900 for providing support within a wireless communication environment for multi-radio coexistence management is illustrated. In an aspect, the system 900 can include one or more UEs 910 and/or eNBs 930, which can engage in UL, downlink, and/or any other suitable communication with each other and/or any other entities in the system 900. In one example, the UE 910 and/or eNB 930 can be operable to communicate using a variety of resources, including frequency channels and sub-bands, some of which can potentially be colliding with other radio resources (e.g., a Bluetooth radio). Thus, the UE 910 can utilize various techniques for managing coexistence between multiple radios of the UE 910, as generally described herein.

To mitigate at least the above shortcomings, the UE 910 can utilize respective features described herein and illustrated by the system 900 to facilitate support for multi-radio coexistence within the UE 910. The channel monitoring module 912, channel coexistence analyzer 914, state monitor module 916, and radio scheduling module 918, may, in some examples described below, be implemented as part of a coexistence manager such as the CxM 640 of FIG. 6 to implement the aspects discussed herein. Thus, for example, a channel monitoring module 912, with the aid of a channel coexistence analyzer 914 and/or other components, can monitor one or more communication channels utilized by the UE 910 and monitor such channels for coexistence issues. The state monitor module 916 may monitor the state (e.g., active/idle states, etc.) of radio use and the radio scheduling module 918 may schedule radio use. The monitoring recognizes that unacceptable performance occurs or is expected to occur due to interference. In one example, a device with multiple radios is equipped to detect interference. Additionally or alternatively, the device may be programmed to know that when certain radios use certain channels, coexistence issues are present. Additionally or alternatively, the device may be programmed to know that certain radios operating at the same time will have coexistence issues. The modules shown in FIG. 9 may be used by the CxM 640 to manage collisions between respective radios 620 by scheduling the respective radios 620 so as to reduce or minimize collisions to the extent possible.

In an aspect, various radios 620 in a wireless device 600 may operate in a Basic Service Set (BSS) mode, such as infrastructure BSS mode or the like. Further, as noted above, one objective of the CxM 640 may be to reduce or minimize collisions between radios 620 to the extent possible. Accordingly, if an LTE radio and WLAN radio are in an infrastructure BSS mode, the CxM 640 may configure operation within the wireless device 600 such that all active applications and traffic may be camped on a single technology. For example, offloading of one or more applications from LTE to WLAN may, in some cases, be desirable from an operator point of view and may avoid collision between the two radios. Additionally or alternatively, using a single technology (e.g., WLAN) may in some cases yield better performance than using two technologies simultaneously and arbitrating if coexistence issues are present.

In other use cases, simultaneous operation may be employed, such as when a mobile device acts as an internet "hotspot" as with MiFi (e.g., soft Access Point (AP)) or the like. In MiFi, a terminal (operating as an access point) communicates with local devices using WiFi but connects to the internet using LTE rather than through a hard wired cable, i.e., wireless backhaul using LTE. In this scenario, LTE and WLAN operate simultaneously. In such cases, radio management may in some cases be achieved based on WLAN channel selection. A solution may perform well for various scenarios (e.g., band class (BC) 40) but less desirably for other scenarios (e.g., BC7, in the case of LTE reception or the like). Thus, if channel selection is not possible or effective, timeline alignment and/or arbitration may in some cases be employed.

LTE may operate in one of two Radio Resource Control (RRC) states, inactive (idle) or connected. These states may be represented as RRC_IDLE and RRC_CONNECTED respectively. Techniques for LTE/WLAN management are provided below in the context of three distinct use cases: (1) LTE is in RRC_IDLE and listening to pages while WLAN is active; (2) LTE is in RRC_CONNECTED while WLAN is searching for/listening to beacons (idle); and (3) both LTE and WLAN are active.

Figure 10:
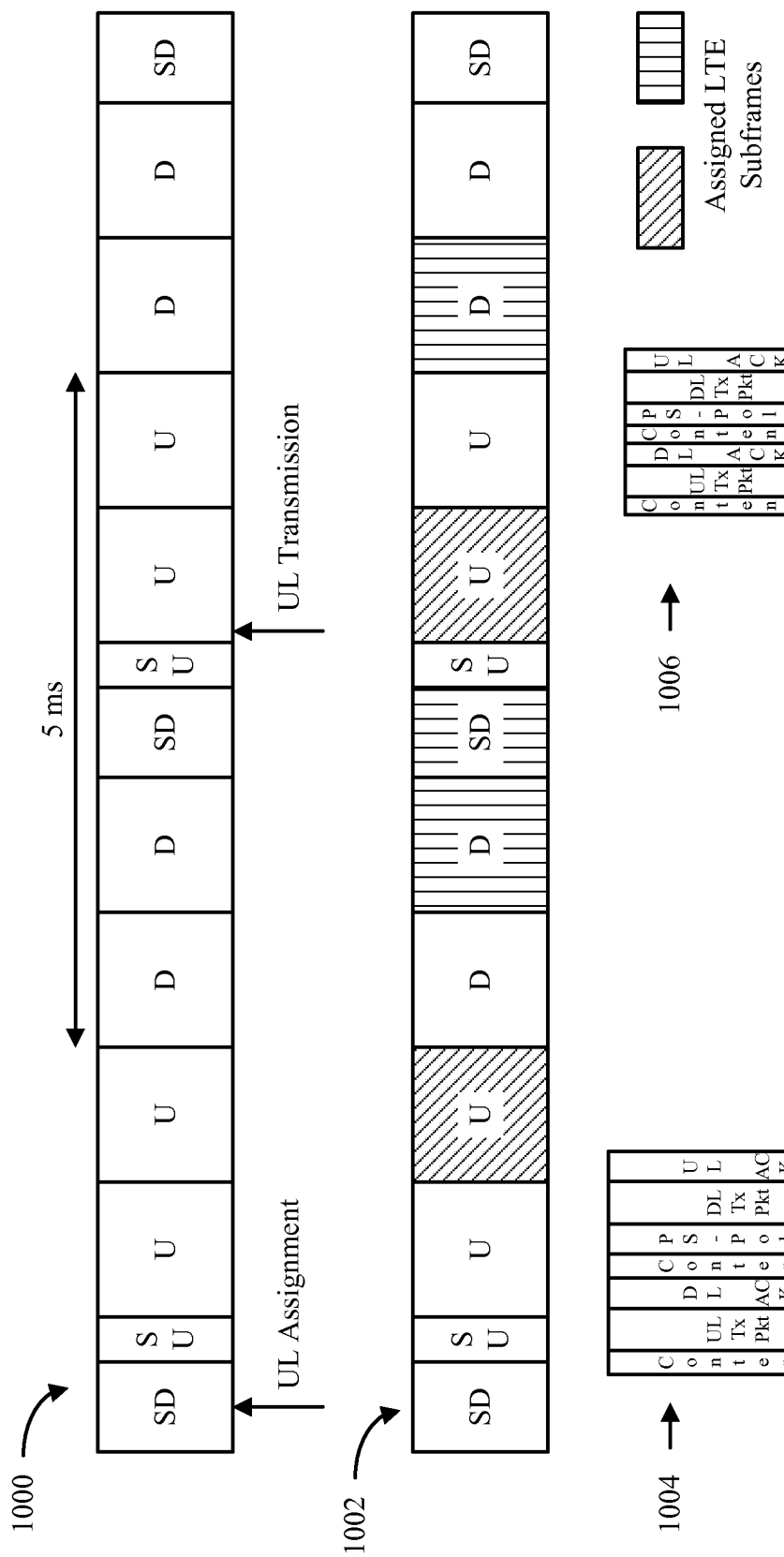
FIG. 10 is a block diagram showing wireless signals according to one aspect.
Figure 11:
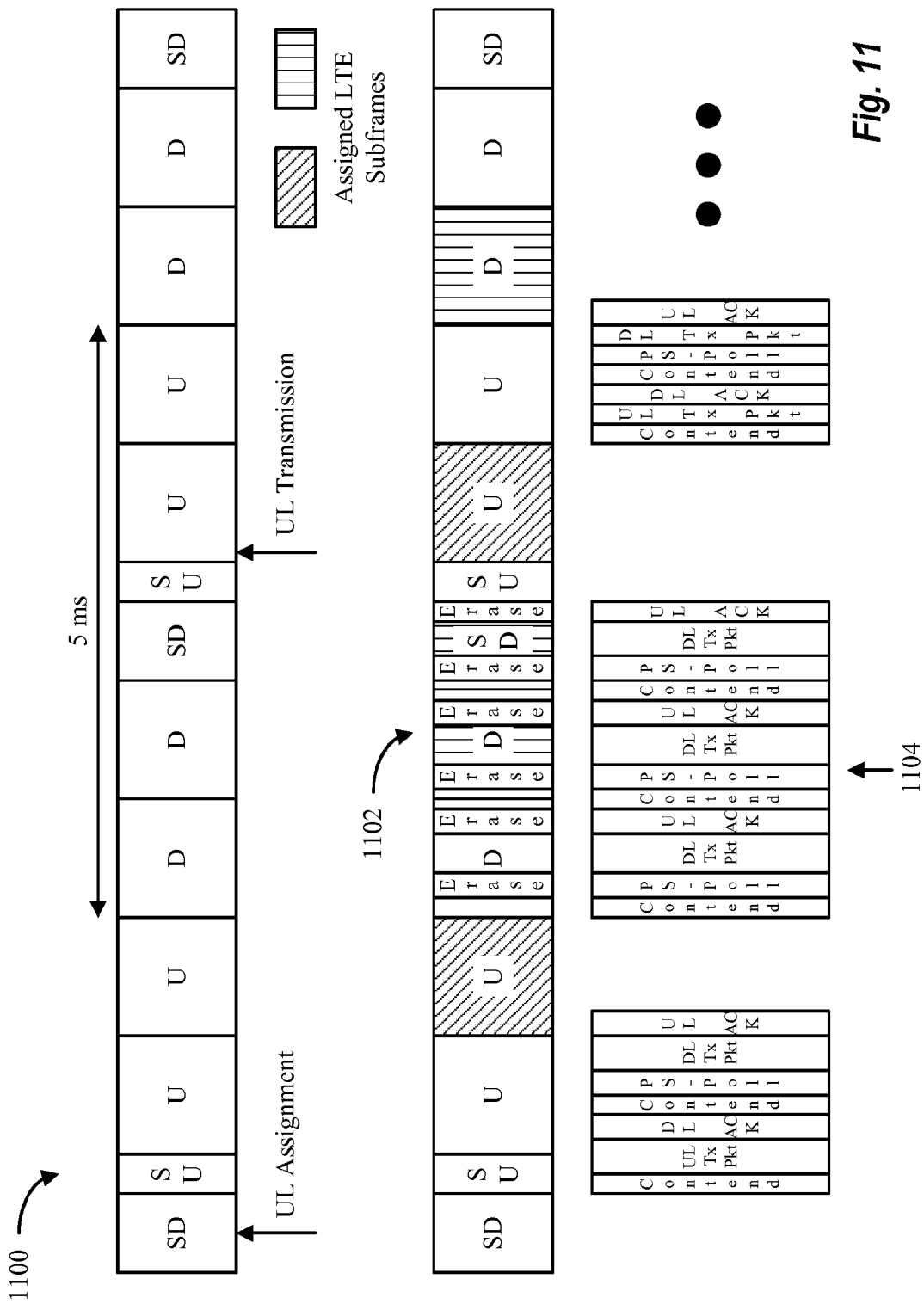
FIG. 11 is a block diagram showing wireless signals according to one aspect.

In the case where both LTE and WLAN may be active, various approaches may be utilized to facilitate LTE/WLAN coexistence. FIGS. 10 and 11 illustrate a first-order solution and a second-order solution, respectively, for managing coexistence between active LTE and WLAN radios; a third-order solution is also described below; however, it should be appreciated that other suitable technique(s) may be utilized.

As noted above, interference between LTE and WLAN occurs when one RAT is trying to transmit and the other RAT is trying to receive at the same time, causing interference with the receiving radio. With reference first to FIG. 10, a first-order solution for management of active LTE and WLAN radios is illustrated for operation in BC40. As shown in diagram 1000, an LTE time division duplex (TDD) configuration may be divided into uplink subframes (indicated by a U), downlink subframes (indicated by a D) or special subframes divided into downlink and uplink portions (indicated by SD and SU). In some configuration, only certain subframes of a frame are available to the LTE radio, as shown by the shaded subframes in diagram 1002. In one aspect, the LTE radio may not use a particular uplink subframe, and may indicate that the time period of that subframe is available for use by the WLAN radio.

As shown in FIG. 10, WLAN communications 1004 and 1006 may take place during unused LTE uplink subframes. Because the time period for these subframes is limited (e.g., 1 millisecond), WLAN throughput may in some cases be lowered, but LTE performance will not be substantially impacted because only unused uplink subframes are dedicated to the WLAN radio. Unused downlink subframes are not dedicated to WLAN in this manner because a UE typically does not know when it will be receiving data in LTE and therefore does not typically know ahead of time what downlink subframes may be unused. Power Save Poll (PS-Poll) messages may be used to communicate between the WLAN radio and WLAN access point (AP) to enter and exit power save mode for the WLAN radio, thereby controlling the starting and stopping of communications between the WLAN radio and AP during the desired periods. A PS-Poll message is a small payload message which is sent by a WLAN radio once it receives an indication from the access point that there is data for the station. The PS-Poll message indicates to the access point that the station is ready to receive a packet. The first-order solution may be used with LTE communications in BC7 or BC40. For LTE communications in BC7 (which operates in FDD), interference between LTE reception and WLAN transmission is uncommon as the LTE downlink bandwidth is sufficiently separated from the ISM band. For LTE uplink, however, if the LTE device is aware it will not be transmitting in an uplink subframe, the LTE device may use the teachings described here to give access to the WLAN radio during that subframe.

Turning next to FIG. 11, a second-order solution for management of active LTE and WLAN radios is illustrated. As shown in FIG. 11, the second-order solution may build on the first-order solution described previously, or may be implemented independently, by adding the utilization of downlink (DL) LTE segments for downlink WLAN. As noted above, interference between LTE and WLAN occurs when one RAT (radio access technology) is trying to transmit and the other RAT is trying to receive at the same time, causing interference with the receiving radio. If both radios are receiving or transmitting, there is no interference. This quality may be used to implement a second-order solution for management when both radios are active. In such an aspect, WLAN downlink communications are scheduled to coincide with LTE downlink communications using the known LTE TDD configuration 1100. Power save mode and PS-Poll functionality may control operation of the WLAN radio to align WLAN communications between the WLAN radio and access point with the LTE timeslots pursuant to this second-order solution. In particular, WLAN downlink communications (from the WLAN AP to the WLAN radio at the UE) may be aligned with LTE downlink communications.

Some difficulties may be presented by the structure of WLAN communications. In the described aspect, each WLAN received downlink packet is preceded by an uplink PS-Poll indication (with a length of approximately 28 µs) and followed by an uplink acknowledgment (UL ACK) (also with a length of approximately 28 µs). In the case of 54 megabit-per-second (Mbps) WLAN, a WLAN packet is approximately 200 µs long. Those WLAN uplink elements (the PS-Poll message and uplink ACK) may potentially interfere with the LTE radio's ability to receive during LTE downlink subframes. This effect is illustrated in FIG. 11. WLAN activity 1104 may cause certain LTE downlink portions to be erased, as shown in LTE frame 1102. Even if such erased LTE downlink portions were not intended for the specific UE, pilot signals may potentially be erased. LTE performance may be improved by avoiding erased samples in LTE demodulation (i.e., instructing the LTE processor to discard any received signals during the time when WLAN was transmitting the PS-Poll message and/or uplink ACK) and/or refraining from using corrupted pilots that may be contained in the LTE signal during the period of WLAN uplink activity.

In certain aspects, the WLAN packet may be scheduled such that the PS-Poll message is sent during an LTE uplink subframe and the WLAN packet is received during an LTE downlink subframe, thereby limiting potential interference between the PS-Poll message and LTE downlink reception (Rx). Prior to sending a message (such as a PS-Poll message or ACK) by the WLAN radio, the UE may determine when LTE reception may be inactive and schedule WLAN uplink transmission during an inactive LTE reception period. The UE may also determine when LTE uplink transmission (Tx) may be inactive and schedule WLAN downlink reception during an inactive LTE Tx period. In another aspect, transmission by the WLAN radio may be scheduled to cause an ACK message from a WLAN access point to be received by the WLAN radio during an LTE inactive uplink subframe.

During certain operations, particularly in certain 802.11 communications, an aggregated ACK message acknowledging a number of packets, may be permitted from the station to the access point. In this case, during a download segment of LTE, one PS-Poll message may be sent and one aggregated ACK may be sent for the packets received within the segment. The PS-Poll message may be adjusted to coincide with the immediately preceding uplink period. Similarly, the ACK may be adjusted at the immediately following uplink period.

Transmissions by a WLAN radio typically only occur once the WLAN radio has determined the desired medium is not presently being used by other WLAN radios. This determination may be done by sensing the level of activity or energy on the medium, comparing the activity level to a threshold and, if the medium is determined to be above the threshold and thus in use, engaging a backoff by the WLAN radio and attempting communication in a different time slot. Active LTE transmission, however, may cause interference with this sensing and in turn effect WLAN operation. The WLAN radio may account for this interference by measuring the interference caused by the LTE radio and offsetting the threshold by the energy measurement to account for the LTE interference. This offset may occur either by subtracting the interference energy from a measured baseline interference or by adding the LTE interference to the energy threshold. In another embodiment, LTE is instructed to stop transmitting so an accurate sensing on the WLAN medium can occur during the stoppage.

The described second-order solution may be used in conjunction with aspects from the first-order solution described above or may be implemented independently. Because the above second-order solution relies on a time division duplexed (TDD) scheme for LTE communications, it may presently only be employed with BC40, but is suitable for other communications employing a TDD configuration.

A third-order solution for management of active LTE and WLAN radios may also be used. The third-order solution provides an additional step over the second-order solution shown by FIG. 11 in that an attempt is made to also align the uplink communications. That is, uplink WLAN periods may be scheduled during active LTE uplink subframes. The third-order solution may be used in combination with the first-order and/or second-order solutions or may be implemented independently.

After WLAN transmits during an uplink segment, the WLAN radio will receive an acknowledgement, which may result in a blanking of LTE uplink transmissions to receive the acknowledgement. Thus, in an aspect, LTE uplink throughput may be affected by the third-order solution in a similar manner to that described for the second-order solution above. Further, LTE uplink throughput may in some cases additionally experience degradation due to blanking transmissions to allow for medium sensing (e.g., contention) and/or WLAN uplink ACKs. In one example, blanking in the uplink involves additional complexity over the downlink performance issues described above, as blanking may in some cases cause a ramp down in power and a subsequent ramp up (e.g., resulting in an effect lasting more than 28 µs). Because the above third-order solution relies on a TDD scheme for LTE communications, it may presently be employed with BC40, but is suitable for other communications employing a TDD configuration.

Figure 12:
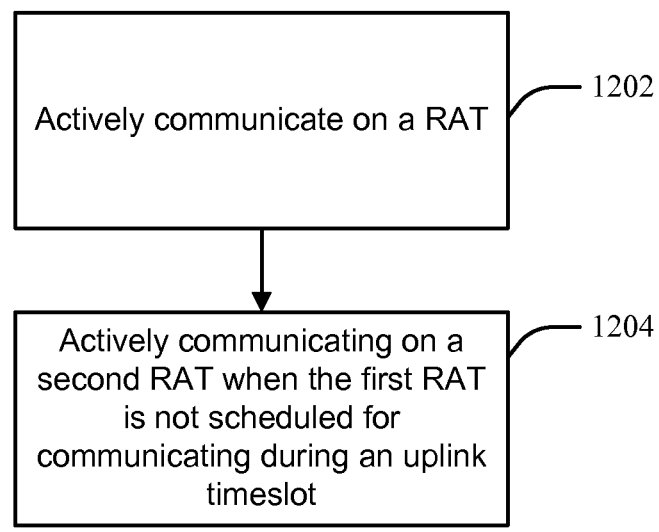
FIG. 12 is a block diagram of a system for providing support within a wireless communication environment for multi-radio coexistence management according to one aspect.

As shown in FIG. 12, a UE may actively communicate on a first radio access technology (RAT) as shown in block 1202. The UE may also actively communicate on a second RAT when the first RAT is not scheduled for communicating during an uplink timeslot, as shown in block 1204.

Figure 13:
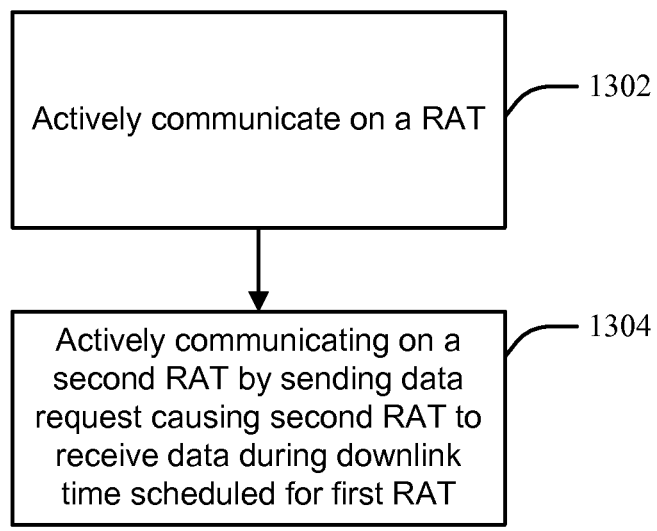
FIG. 13 is a block diagram of a system for providing support within a wireless communication environment for multi-radio coexistence management according to one aspect.

As shown in FIG. 13, a UE may actively communicate on a first radio access technology (RAT) as shown in block 1302. The UE may also actively communicate on a second RAT by sending a data request causing the second RAT to receive data during a downlink time scheduled for the first RAT, as shown in block 1304.

A UE may comprise means for actively communicating on a first radio access technology (RAT) and means for actively communicating on a second RAT when the first RAT is not scheduled for communicating during an uplink timeslot. A UE may also comprise means for actively communicating on a second RAT by sending a data request causing the second RAT to receive data during a downlink time scheduled for the first RAT. The means may include components CxM 640, channel monitoring module 912, channel coexistence analyzer 914, state monitor module 916, radio scheduling module 918 memory 272, processor 270, antenna 252*a-r*, Rx data processor 260, Tx data processor 238, data source 236, transceivers 254*a-r*, modulator 280, transmit data processor 238, antennas 252*a-r*, and/or receive data processor 260. In another aspect, the aforementioned means may be a module or any apparatus configured to perform the functions recited by the aforementioned means.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
   actively communicating on a Long Term Evolution (LTE) radio access technology (RAT);
   actively communicating on a wireless local area network (WLAN) RAT when the LTE RAT is not scheduled for communicating during an uplink timeslot;
   controlling communications of a WLAN radio through the use of Power Save Poll messages between the WLAN radio and a WLAN access point; and
   transmitting a Power Save Poll message and an acknowledgement message during a time period coinciding with LTE uplink time slots.

2. The method of claim 1 in which the acknowledgement message comprises an aggregated acknowledgment message.

3. The method of claim 1 further comprising blanking LTE uplink transmissions to receive a WLAN downlink acknowledgement message.

4. The method of claim 1 further comprising scheduling transmission by the WLAN radio to cause an acknowledgement message from the WLAN access point to be received by the WLAN radio during a time period coinciding with an LTE inactive uplink subframe.

5. The method of claim 1 further comprising determining an activity level of a resource of the WLAN RAT by:
   determining a level of interference caused by the LTE RAT when actively communicating;
   measuring the activity level in the resource of the WLAN RAT; and
   determining the resource of the WLAN RAT is inactive when the activity level is at or below a threshold, while accounting for the level of interference caused by the LTE RAT.

6. The method of claim 1 further comprising determining an activity level of a resource of the WLAN RAT by measuring the activity level in the resource of the WLAN RAT during a time period when the LTE RAT is instructed to stop communications.

7. A method of wireless communication, comprising:
   actively communicating on a Long Term Evolution (LTE) radio access technology (RAT);
   actively communicating on a wireless local area network (WLAN) RAT when the LTE RAT is not scheduled for communicating during an uplink timeslot;
   controlling communications of a WLAN radio through the use of Power Save Poll messages between the WLAN radio and a WLAN access point;
   when scheduling a Power Save Poll message or acknowledgment message during a time period coinciding with an LTE uplink timeslot is not possible, transmitting the Power Save Poll message or the acknowledgement message during a time period coinciding with an LTE downlink timeslot; and
   blanking LTE operation during the time period coinciding with the LTE downlink timeslot.

8. An apparatus operable in a wireless communication system, the apparatus comprising:
   means for actively communicating on a Long Term Evolution (LTE) radio access technology (RAT);
   means for actively communicating on a wireless local area network (WLAN) RAT when the LTE RAT is not scheduled for communicating during an uplink timeslot;
   means for controlling communications of a WLAN radio through the use of Power Save Poll messages between the WLAN radio and a WLAN access point; and
   means for transmitting a Power Save Poll message and an acknowledgement message during a time period coinciding with LTE uplink time slots.

9. A computer program product configured for wireless communication, the computer program product comprising:
   a non-transitory computer-readable medium having executable program code recorded thereon, the program code comprising:

program code to actively communicate on a Long Term Evolution (LTE) radio access technology (RAT);

program code to actively communicate on a wireless local area network (WLAN) RAT when the LTE RAT is not scheduled for communicating during an uplink timeslot;

program code to control communications of a WLAN radio through the use of Power Save Poll messages between the WLAN radio and a WLAN access point; and program code to transmit a Power Save Poll message and an acknowledgement message during a time period coinciding with LTE uplink time slots.

10. An apparatus configured for operation in a wireless communication network, the apparatus comprising:

a memory; and at least one processor coupled to the memory, the at least one processor being configured:

to actively communicate on a Long Term Evolution (LTE) radio access technology (RAT);

to actively communicate on a wireless local area network (WLAN) RAT when the LTE RAT is not scheduled for communicating during an uplink timeslot;

to control communications of a WLAN radio through the use of Power Save Poll messages between the WLAN radio and a WLAN access point; and to transmit a Power Save Poll message and an acknowledgement message during a time period coinciding with LTE uplink time slots.

11. The apparatus of claim 10 in which the acknowledgement message comprises an aggregated acknowledgment message.

12. The apparatus of claim 10 in which the at least one processor is further configured to blank LTE uplink transmissions to receive a WLAN downlink acknowledgement message.

13. The apparatus of claim 10 in which the at least one processor is further configured to schedule transmission by the WLAN radio to cause an acknowledgement message from a WLAN access point to be received by the WLAN radio during a time period coinciding with an LTE inactive uplink subframe.

14. The apparatus of claim 10 in which the at least one processor is further configured to determine an activity level of a resource of the WLAN RAT by:

determining a level of interference caused by the LTE RAT when actively communicating;

measuring the activity level in the resource of the WLAN RAT; and determining the resource of the WLAN RAT is inactive when the activity level is at or below a threshold, while accounting for the level of interference caused by the LTE RAT.

15. The apparatus of claim 10 in which the at least one processor is further configured to determine an activity level of a resource of the WLAN RAT by measuring the activity level in the resource of the WLAN RAT during a time period when the LTE RAT is instructed to stop communications.

16. An apparatus configured for operation in a wireless communication network, the apparatus comprising:

a memory; and at least one processor coupled to the memory, the at least one processor being configured:

to actively communicate on a Long Term Evolution (LTE) radio access technology (RAT);

to actively communicate on a wireless local area network (WLAN) RAT when the LTE RAT is not scheduled for communicating during an uplink timeslot;

to control communications of a WLAN radio through the use of Power Save Poll messages between the WLAN radio and a WLAN access point;

when scheduling a Power Save Poll message or acknowledgment message during a time period coinciding with an LTE uplink timeslot is not possible, to transmit the Power Save Poll message or the acknowledgement message during a time period coinciding with an LTE downlink timeslot; and to blank LTE operation during the time period coinciding with the LTE downlink timeslot.

* * * * *